No. 793,655. Patented July 4, 1905.

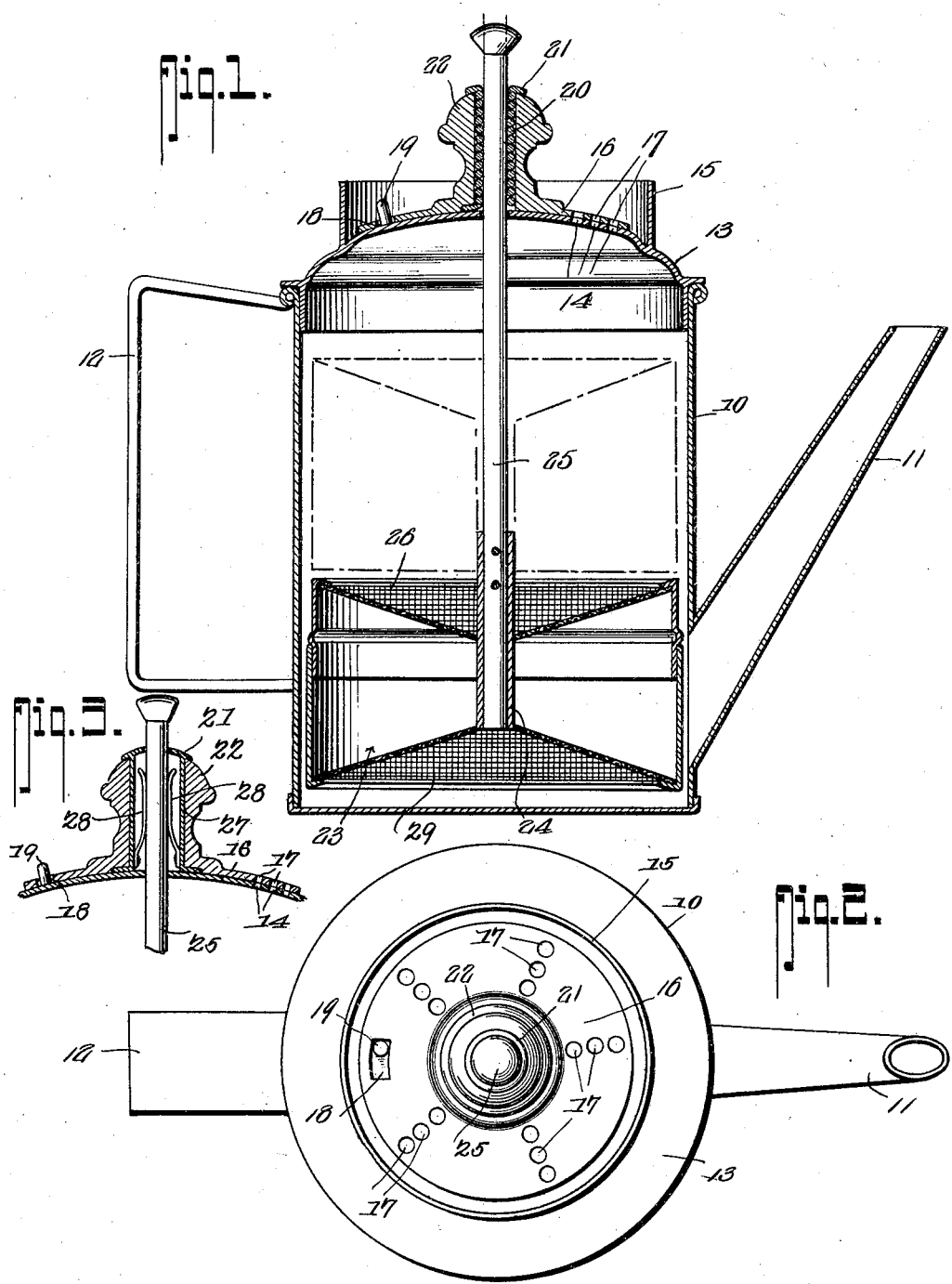

UNITED STATES PATENT OFFICE.

WILLIAM L. HALEY, OF ALVIN, TEXAS.

COFFEE-POT.

SPECIFICATION forming part of Letters Patent No. 793,655, dated July 4, 1905.

Application filed August 31, 1904. Serial No. 222,875.

*To all whom it may concern:*

Be it known that I, WILLIAM L. HALEY, a citizen of the United States, residing at Alvin, in the county of Brazoria and State of Texas, have invented a new and useful Coffee-Pot, of which the following is a specification.

This invention relates to coffee-pots, and has for its object to produce a simply-constructed and efficient device of this character whereby the active principle of the coffee may be extracted either by immersing the receptacle containing the same in the boiling water or supporting the receptacle above the water and effecting the extraction by causing the hot water to flow through the same as may be required and without structural change in the device.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may resorted to without departing from the principle of the invention or sacrificing any of its advantages.

In the drawings thus employed, Figure 1 is a sectional side elevation. Fig. 2 is a plan view. Fig. 3 is a sectional detail illustrating a modification in the construction.

The outer casing 10 may be of any required size or shape or of any required material and is provided with the pouring-spout 11, handle 12, and a detachable cover 13.

The cover is provided with a concentric row of apertures 14, spaced apart, and also provided with an upwardly-extending annular rim 15 outside the apertures to provide means for pouring hot water through the cover member when required. Resting upon the cover member 13 within the rim 15 is a shut-off plate 16, having perforations 17, corresponding to the perforations 14 in the cover member and adapted for registration therewith when the plate is set in one position and shutting off the cover-perforations when the plate is rotated. The shut-off plate is provided with a slot 18, through which a pin 19 extends from the cover 13 to limit the rotative movement of the plate.

Extending upward centrally from the cover member is a bearing-stud, which may be in the form of a coiled spring 20 and having a flange 21 connected to its upper end, or in the form of a tube, as at 27 in Fig. 3. Surrounding this bearing is a knob 22, connected to the shut-off plate 16 and serving as a means for rotating the same and also as a means for lifting the cover member and its attachments.

Disposed within the casing 10 is a percolating-receptacle 23 for the coffee, having a conical perforated bottom 29, and rising centrally from this bottom is a tubular sleeve or socket 24, and connected to this socket is a rod 25, extending upwardly through the bearing member 20 or 27, as the case may be. The bearing 20 or 27 is designed to contain means for exerting a pressure upon the rod to produce a constant tension upon the same to support the "charge" of coffee at any desired point within the casing 10, but will yield to pressure exerted upon the rod to adjust the receptacle. When the spring-coil is employed to form the bearing for the knob, as at 20 in Fig. 1, the same will also be utilized to produce the required tension upon the rod; but separate springs, as at 28 in Fig. 3, may be employed for this purpose, if preferred, and I do not, therefore, desire to be limited to any particular form of the tension member. Thus the receptacle 23 may be lowered to the bottom of the casing 10 when it is desired to immerse the coffee in the boiling water or to maintain it in an elevated position above the water when it is desired to make "drip-coffee," as will be obvious. The rod 25 will be preferably composed of suitable non-heat-conducting material, such as hard wood, so that it will not become heated sufficiently to prevent it from being grasped by the fingers when it is required to adjust it. A conical perforated cover 26 may be attached to the receptacle 23 and slidable vertically upon the tubular standard 24 to permit its elevation to insert the charge of coffee. By this arrangement when the coffee is to be extracted by immersion in the hot water the rod 25 is lowered down through the tension-spring to bring the receptacle to the bottom of the casing 10.

If drip-coffee is to be made, the rod 25 is drawn upward to bring the receptacle 23 above the water in the casing, as indicated by dotted lines in Fig. 1, and the shut-off plate 16 rotated by the knob 22 to open the ports 14 17 and the requisite amount of hot water poured into the rim 15, from whence it runs through the ports and upon the cover 26 and thence through the coffee in the receptacle. The shut-off plate is then turned back to its former position to close the apertures 14 and prevent the escape of the aroma of the coffee.

It will be noted that a very simply-constructed and efficient device is thus produced which may be inexpensively manufactured in various sizes, as required.

Having thus described the invention, what is claimed is—

1. A pot or vessel, a lid for the same provided with an aperture, a knob connected with the lid and having an aperture registering with the aperture in the lid, a percolating-receptacle within the vessel, a rod connected with said receptacle and extending through the apertured lid and knob, and a spring disposed within the knob and having frictional engagement with said rod.

2. A pot or vessel, a lid for the same having an aperture, a knob connected with said lid and having an aperture registering with the aperture in the lid, a percolating-receptacle within the vessel, a rod of wood or similar non-conducting material connected with the percolating-receptacle and extending through the apertured lid and knob, and spring means within said knob frictionally engaging the non-conductive rod to support the latter and the percolating-receptacle at various adjustments.

3. A pot or vessel, a lid for the same having an aperture, a knob connected with said lid and having an aperture registering with the aperture in the lid, a percolating-receptacle within the vessel, a rod connected with said receptacle and extending through the apertured lid and knob, and a flange rising from the lid, said lid being provided with perforations for the passage of liquid poured thereupon within the flange.

4. A pot or vessel, a lid for the same having an aperture and a plurality of perforations concentric therewith, a marginal flange rising from said lid, a knob connected with said lid for rotation and having an aperture registering with the aperture in the lid, a shut-off plate connected with said knob and having perforations adapted to register with the perforations in the lid, a percolating-receptacle within the vessel, and a rod connected with said receptacle and extending through the apertured lid and knob.

In testimony that I claim the foregoing as my own I have hereto affixed my signature in the presence of two witnesses.

WILLIAM L. HALEY.

Witnesses:
W. C. PONDER,
T. E. HILL.